United States Patent
Okano et al.

(10) Patent No.: US 11,587,223 B2
(45) Date of Patent: Feb. 21, 2023

(54) INSPECTION APPARATUS THAT DETECTS DEFECT IN IMAGE AND INSPECTION METHOD AND STORAGE MEDIUM THEREOF

(71) Applicant: KABUSHIKI KAISHA TOSHIBA, Tokyo (JP)

(72) Inventors: Hideaki Okano, Yokohama Kanagawa (JP); Yoshinori Honguh, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 193 days.

(21) Appl. No.: 17/007,250

(22) Filed: Aug. 31, 2020

(65) Prior Publication Data
US 2021/0272256 A1 Sep. 2, 2021

(30) Foreign Application Priority Data
Feb. 28, 2020 (JP) .............................. JP2020-033328

(51) Int. Cl.
*G06T 7/00* (2017.01)
*G06T 7/11* (2017.01)
*G06V 10/75* (2022.01)

(52) U.S. Cl.
CPC ................ *G06T 7/001* (2013.01); *G06T 7/11* (2017.01); *G06V 10/758* (2022.01); *G06T 2207/10061* (2013.01); *G06T 2207/10152* (2013.01); *G06T 2207/30148* (2013.01); *G06V 10/759* (2022.01)

(58) Field of Classification Search
CPC .......... G06T 2207/30148; G06T 2207/10152; G06T 2207/10061; G06T 7/11; G06T 7/001; G06V 10/759; G06V 10/758
See application file for complete search history.

(56) References Cited

U.S. PATENT DOCUMENTS

| | | | |
|---|---|---|---|
| 6,868,175 B1 | 3/2005 | Yamamoto et al. | |
| 7,697,746 B2 * | 4/2010 | Kawaguchi | ............... G06T 5/40 382/149 |
| 7,796,801 B2 * | 9/2010 | Kitamura | .............. G06T 7/0004 382/199 |
| 8,019,144 B2 | 9/2011 | Sugihara | |
| 11,340,175 B2 * | 5/2022 | Klimmey | ......... G01N 21/95607 |

(Continued)

FOREIGN PATENT DOCUMENTS

| | | |
|---|---|---|
| JP | 2005-277395 A | 10/2005 |
| JP | 2005-321237 A | 11/2005 |

(Continued)

*Primary Examiner* — Mia M Thomas
(74) *Attorney, Agent, or Firm* — Finnegan, Henderson, Farabow, Garrett & Dunner, LLP

(57) ABSTRACT

According to one embodiment, an inspection apparatus includes an image generation device which generates a second image corresponding to a first image and a defect detection device which detects a defect in the second image with respect to the first image. The defect detection device is configured to extract a first partial region in which an amount of change of a luminance of the first image and an amount of change of a luminance of the second image have a correlation, and correct, in the first partial region, the luminance of the first image with respect to the luminance of the second image.

18 Claims, 12 Drawing Sheets

(56) References Cited

U.S. PATENT DOCUMENTS

| | | | |
|---|---|---|---|
| 2001/0053245 A1* | 12/2001 | Sakai | G06T 7/32 382/218 |
| 2002/0181760 A1* | 12/2002 | Asai | G06T 7/0002 382/149 |
| 2003/0021462 A1* | 1/2003 | Sakai | G06T 7/001 382/145 |
| 2006/0002604 A1* | 1/2006 | Sakai | G06T 7/001 382/141 |
| 2006/0018530 A1 | 1/2006 | Oaki et al. | |
| 2006/0215900 A1 | 9/2006 | Oaki et al. | |
| 2007/0121106 A1* | 5/2007 | Shibata | G01N 21/8806 356/237.2 |
| 2008/0130982 A1* | 6/2008 | Kitamura | G06T 7/001 382/144 |
| 2008/0144922 A1* | 6/2008 | Naiki | G06V 10/245 382/145 |
| 2009/0257647 A1* | 10/2009 | Yoshitake | G06T 7/0004 348/308 |
| 2013/0294677 A1* | 11/2013 | Urano | G01N 21/956 382/141 |
| 2013/0322737 A1 | 12/2013 | Murakami et al. | |
| 2015/0287201 A1 | 10/2015 | Shinoda et al. | |
| 2015/0356727 A1* | 12/2015 | Urano | G06T 7/0008 382/149 |
| 2017/0186144 A1 | 6/2017 | Chien et al. | |
| 2017/0230577 A1* | 8/2017 | Ishii | G06T 5/007 |
| 2018/0266968 A1* | 9/2018 | Hirai | G06T 7/001 |
| 2019/0279349 A1 | 9/2019 | Morino et al. | |
| 2020/0025690 A1* | 1/2020 | Koshihara | G06T 7/0004 |
| 2021/0262944 A1* | 8/2021 | Juschkin | G01N 21/8851 |

FOREIGN PATENT DOCUMENTS

| | | |
|---|---|---|
| JP | 2006-30518 A | 2/2006 |
| JP | 3965189 B2 | 8/2007 |
| JP | 2008-128651 A | 6/2008 |
| JP | 2009-198440 A | 9/2009 |
| JP | 5771561 B2 | 9/2015 |
| JP | 2017-130980 A | 7/2017 |
| JP | 2019-158405 A | 9/2019 |
| WO | WO 2013-122022 A1 | 8/2013 |

* cited by examiner

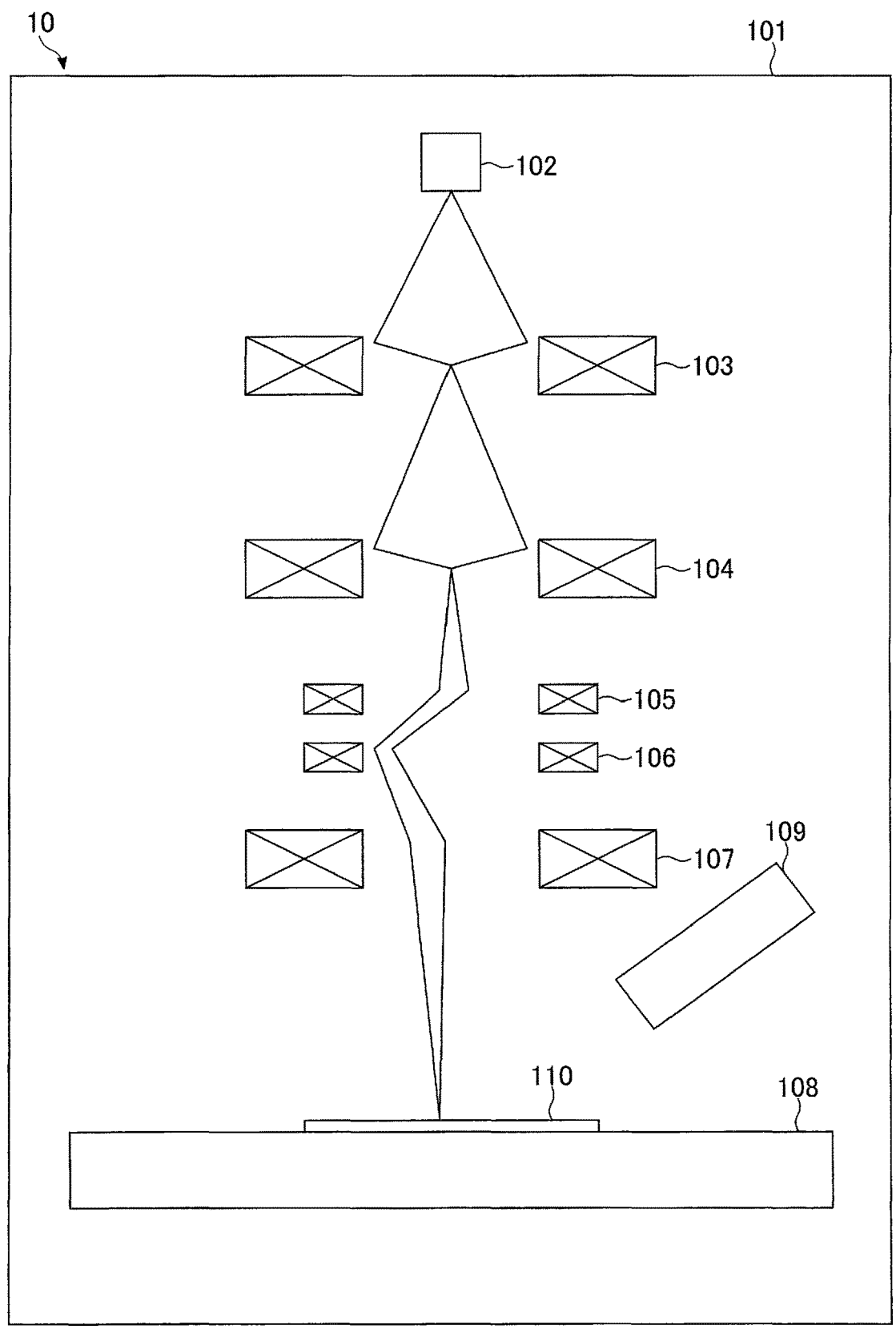
F I G. 2

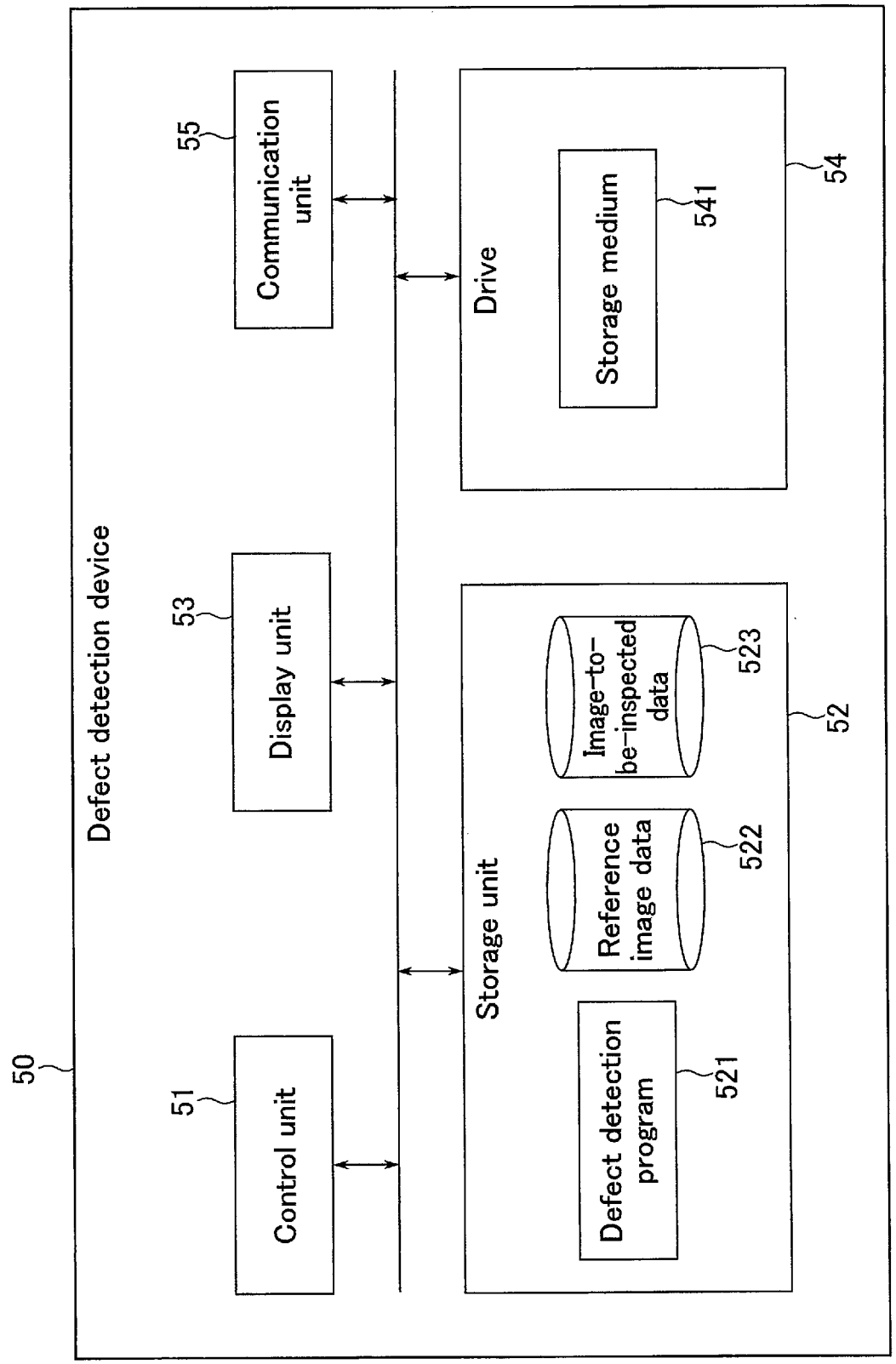
F I G. 3

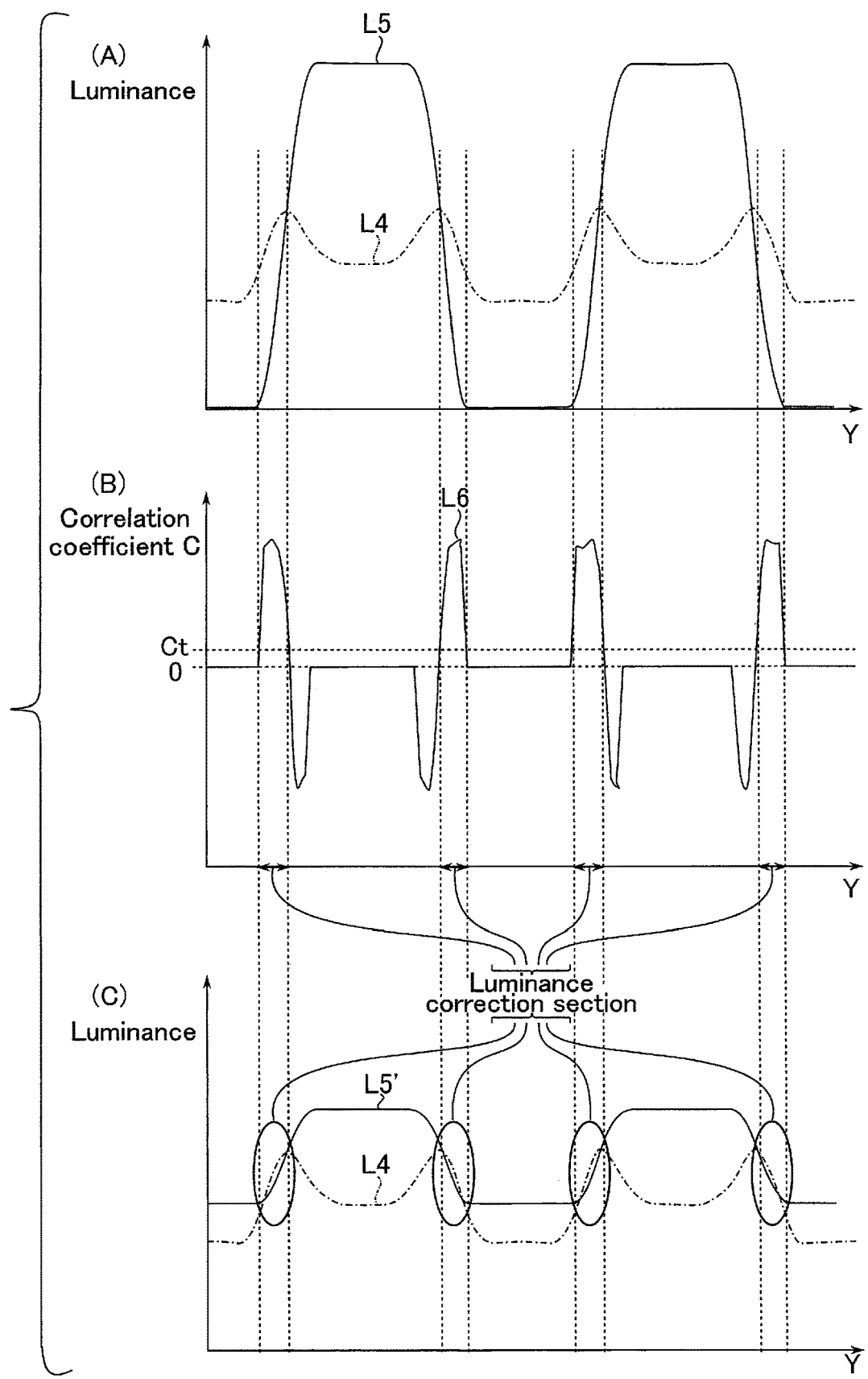
F I G. 9

000
INSPECTION APPARATUS THAT DETECTS DEFECT IN IMAGE AND INSPECTION METHOD AND STORAGE MEDIUM THEREOF

CROSS-REFERENCE TO RELATED APPLICATIONS

This application is based upon and claims the benefit of priority from Japanese Patent Application No. 2020-033328, filed Feb. 28, 2020, the entire contents of which are incorporated herein by reference.

FIELD

An embodiment of the present invention relates to an inspection apparatus capable of detecting a defect in a mask used in manufacturing a semiconductor device.

BACKGROUND

In inspection of a circuit pattern provided on a semiconductor device, a process of comparing and computing an image to be inspected, which has been actually acquired, with a reference image, which is used as a reference based on which it is evaluated whether the circuit pattern is in the correct state, is performed, thereby generating a differential image between them. If no defect exists in the image to be inspected, the differential image will be a flat image with a substantially constant tone. If a defect exists, a pattern that shows a notable light-dark change with respect to its surroundings appears at the same position as that of the defect in the differential image.

Owing to a cause that is unavoidable in principle, the environment during inspection, etc., a position gap and spatial distortion exist in an image to be inspected. In such a case, a pattern called a false defect that exhibits a notable light-dark change with respect to its surroundings, even though it is not actually a defect, may occur in the differential image generated in the above manner.

To suppress erroneous defect detection due to a false defect, various schemes have been proposed for measuring and estimating a position gap and distortion based on comparison of a circuit pattern. However, when a reference image is generated from a database, a luminance difference may occur between the reference image and an image to be inspected, and the luminance difference may prevent the position gap and the spatial distortion from being estimated with a high precision.

BRIEF DESCRIPTION OF THE DRAWINGS

FIG. 2 is a schematic diagram illustrating an example of a hardware configuration of a real image data generation device of the inspection apparatus according to the first embodiment.

FIG. 3 is a block diagram illustrating an example of a hardware configuration of a defect detection device of the inspection apparatus according to the first embodiment.

FIG. 9 is a diagram illustrating an example of an edge region extraction operation and a luminance correction operation in the defect detection device of the inspection apparatus according to the first embodiment.

DETAILED DESCRIPTION

Figure 1:
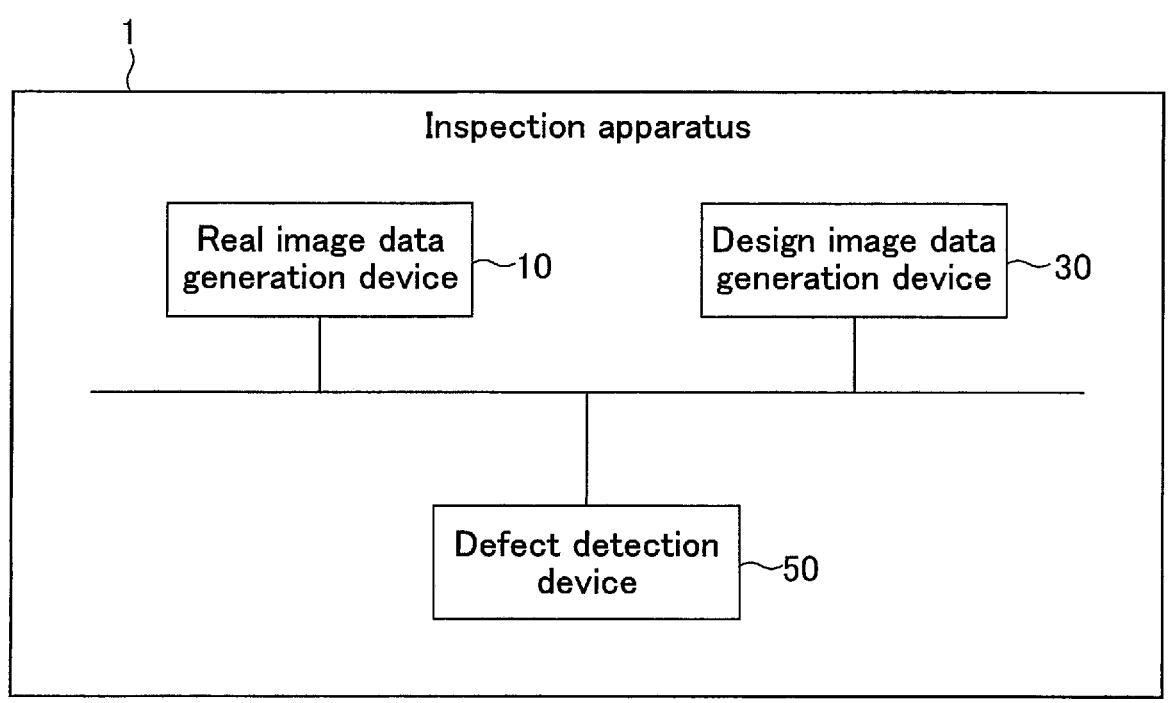
FIG. 1 is a block diagram illustrating an example of an overall configuration of an inspection apparatus according to a first embodiment.

In general, according to one embodiment, an inspection apparatus includes an image generation device which generates a second image corresponding to a first image, and a defect detection device which detects a defect in the second image with respect to the first image. The defect detection device is configured to extract a first partial region in which an amount of change of a luminance of the first image and an amount of change of a luminance of the second image have a correlation, and correct, in the first partial region, the luminance of the first image with respect to the luminance of the second image.

Hereinafter, embodiments will be described with reference to the accompanying drawings. In the description that follows, components having the same function and configuration will be denoted by a common reference numeral.

1. First Embodiment

An inspection apparatus according to a first embodiment will be described.

The inspection apparatus according to the first embodiment includes, for example, a defect inspection device that inspects a defect in a semiconductor device. The semiconductor device includes, for example, a semiconductor memory device such as a NAND flash memory.

1.1 Hardware Configuration

A hardware configuration of the inspection apparatus according to the first embodiment will be described.

1.1.1 Overall Configuration

An overall configuration of the inspection apparatus according to the first embodiment will be described.

FIG. 1 is a block diagram showing an example of an overall configuration of the inspection apparatus according to the first embodiment. As shown in FIG. 1, the inspection apparatus 1 includes a real image data generation device 10, a design image data generation device 30, and a defect detection device 50.

The real image data generation device 10 functions as, for example, a scanning electron microscope (SEM) capable of generating an electronic image of a pattern transferred onto a semiconductor device (not illustrated) as real image data. The real image data generation device 10 transmits the generated real image data to the defect detection device 50.

The design image data generation device 30 has a function of generating, based on design data of the pattern transferred onto the semiconductor device, design image data of the pattern. The design data is, for example, stored in the design image data generation device 30 in a format such as computer-aided design (CAD) data. The design image data generation device 30 converts the design data into a data format (design image data) that is applicable to a defect detection process in the defect detection device 50, and then transmits the design image data to the defect detection device 50.

The defect detection device 50 receives the real image data from the real image data generation device 10, and the design image data from the design image data generation device 30. The defect detection device 50 regards a pair of real image data and design image data as a pair of image-to-be-inspected data and reference image data. The image-to-be-inspected data is image data to be a target of defect detection. The reference image data is image data that is used as a reference based on which defect detection is performed on image-to-be-inspected data. The defect detection device 50 detects a defect present in the image-to-be-inspected data by comparing the image-to-be-inspected data and the reference image data corresponding to the image-to-be-inspected data. Based on the defect detected in the image-to-be-inspected data, the defect detection device 50 specifies a defect present in the pattern. Such a method of using real image data and design image data is also referred to as a die-to-database (DB) comparison.

1.1.2 Hardware Configuration of Real Image Data Generation Device

Next, a hardware configuration of the real image data generation device of the inspection apparatus according to the first embodiment will be described.

FIG. 2 is a schematic diagram illustrating a hardware configuration of the real image data generation device according to the first embodiment. FIG. 2 schematically shows a hardware configuration of an SEM as an example of the real image data generation device 10.

As shown in FIG. 2, the real image data generation device 10 includes, for example, an electron source 102, a plurality of condenser lenses 103 and 104, a plurality of scanning coils 105 and 106, an objective lens 107, a stage 108, and a sensor 109, which are stored in a chamber 101.

An electron beam emitted by the electron source 102 is accelerated and then focused by the condenser lenses 103 and 104 and the objective lens 107 onto a surface of the semiconductor device 110 mounted on the stage 108 as an electron spot. The scanning coils 105 and 106 control the position of the electron spot on the semiconductor device 110.

The sensor 109 detects, for example, electrons reflected from the semiconductor device 110. The real image data generation device 10 processes the detected electrons in an unillustrated processor, and generates real image data of the pattern on the semiconductor device 110 (i.e., an electronic image of the semiconductor device 110 on which a pattern is transferred with an unillustrated mask). The generated real image data is transmitted to the defect detection device 50.

1.1.3 Hardware Configuration of Defect Detection Device

Next, a hardware configuration of the defect detection device of the inspection apparatus according to the first embodiment will be described. FIG. 3 is a block diagram illustrating a hardware configuration of the defect detection device of the inspection apparatus according to the first embodiment.

As shown in FIG. 3, the defect detection device 50 includes a control unit 51, a storage unit 52, a display unit 53, a drive 54, and a communication unit 55.

The control unit 51 includes a central processing unit (CPU), a random access memory (RAM), a read-only memory (ROM), etc., and controls the entire operation of the defect detection device 50.

The storage unit 52 is, for example, an auxiliary storage device such as a hard disk drive (HDD), a solid state drive (SSD), etc. The storage unit 52 stores a defect detection program 521 to be executed by the defect detection device 50. The storage unit 52 stores, for example, reference image data 522 and image-to-be-inspected data 523 as input information necessary for executing the defect detection program 521.

The defect detection program 521 is a program for causing the defect detection device 50 to execute a defect detection process of detecting, from the image-to-be-inspected data 523, a point that is significantly different from the reference image data 522. Details of the defect detection process will be described later.

The display unit 53 includes, for example, a display screen (e.g., a liquid crystal display (LCD) or an electroluminescent (EL) display). The display unit 53 outputs a result of the execution of the defect detection program 521 executed by the control unit 51 to the user.

The drive 54 is a device for reading a program stored in the storage medium 541, such as a compact disk (CD) drive, a digital versatile disk (DVD) drive, etc. The type of the drive 54 may be suitably selected according to the type of the storage medium 541. The defect detection program 521 may be stored in the storage medium 541.

The storage medium 541 is a medium that accumulates information such as a recorded program by an electronic, magnetic, optical, mechanical, or chemical reaction such that the information on the program can be read by a computer or other devices, machines, etc. The defect detection device 50 may acquire the defect detection program 521 from the storage medium 541.

The communication unit 55 is a communication interface that manages communications between the defect detection device 50 and an exterior portion including the real image data generation device 10 and the design image data generation device 30. The communication unit 55 receives, for example, real image data and design image data from the exterior portion and stores them in the storage unit 52. The communication unit 55 outputs a result of comparison generated as a result of the execution of the defect detection program 521 to the exterior portion.

1.2 Functional Configuration

Next, a functional configuration of the inspection apparatus according to the first embodiment will be described.

1.2.1 Functional Configuration of Defect Detection Device

A functional configuration of the defect detection device of the inspection apparatus according to the first embodiment will be described.

The control unit 51 of the defect detection device 50 loads, for example, the defect detection program 521 stored in the storage unit 52 into a RAM. The control unit 51 causes the CPU to interpret and execute the defect detection program 521 loaded into the RAM, and controls the constituent elements.

Figure 4:
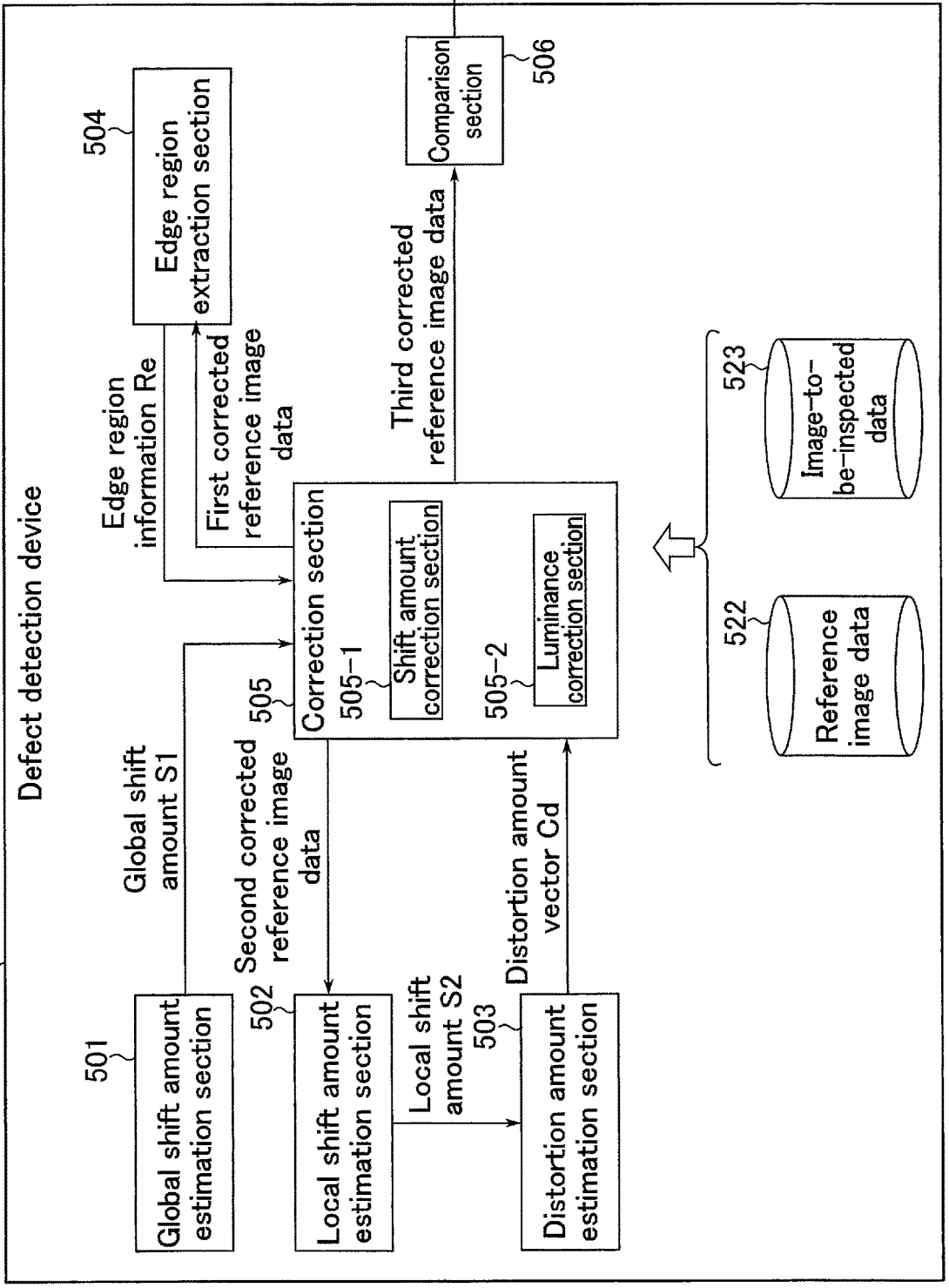
FIG. 4 is a block diagram illustrating an example of a functional configuration of the defect detection device of the inspection apparatus according to the first embodiment.

FIG. 4 is a block diagram illustrating part of a functional configuration of the defect detection device of the inspection apparatus according to the first embodiment that is related to a defect detection process.

As shown in FIG. 4, the defect detection device 50 functions as a computer that includes a global shift amount estimation section 501, a local shift amount estimation section 502, a distortion amount estimation section 503, an edge region extraction section 504, a correction section 505, and a comparison section 506 when a defect detection process is executed based on the reference image data 522 and the image-to-be-inspected data 523. In the description that follows, let us assume that each of the reference image data 522 and the image-to-be-inspected data 523 is a set of luminance values of pixels arranged in an XY plane configured of an X-axis and a Y-axis that intersect each other. More specifically, a luminance value at coordinates (x, y) of the reference image data 522 is represented as $I_R(x, y)$, and a luminance value at coordinates (x, y) of the image-to-be-inspected data 523 is represented as $I_S(x, y)$.

The global shift amount estimation section 501 and the local shift amount estimation section 502 have a function of estimating a shift amount S at which an error between the two items of image data is minimized. More specifically, the global shift amount estimation section 501 and the local shift amount estimation section 502 calculate an evaluation value E based on, for example, the following formula (1):

$$E(s_x, s_y) = \Sigma_{j=0}^{N-1} \Sigma_{i=0}^{N-1} (I_S(i-S_x, j-s_y) - I_R(i,j))^2 \quad (1)$$

Here, let us assume that the range of evaluation of the two items of image data is a range configured of N×N pixels (0≤x, y≤N−1).

The global shift amount estimation section 501 and the local shift amount estimation section 502 estimate a shift amount $S=(s_x, s_y)$ at which the calculated evaluation value E is minimized. Thereby, a shift amount S is estimated at which, when one of the items of image data is shifted to the other item of image data, the luminance difference between the two items of image data is minimized over their entire evaluation ranges. Such a linear matching technique between two items of image data is referred to as a sum of squared differences (SSD) matching, and an evaluation value E calculated by SSD matching is also referred to as an SSD value. As will be described below, the shift amount S includes, for example, a global shift amount S1 and local shift amounts S2.

The global shift amount estimation section 501 estimates a global shift amount $S1=(s1_x, s1_y)$ by applying the SSD matching to the entirety of the reference image data 522 and the image-to-be-inspected data 523. The global shift amount estimation section 501 transmits the global shift amount S1 to the correction section 505.

The local shift amount estimation section 502 receives reference image data (second corrected reference image data) corrected by the correction section 505. The local shift amount estimation section 502 estimates local shift amounts S2 by applying the SSD matching to partial regions of the second corrected reference image data and the image-to-be-inspected data 523. For example, the local shift amount estimation section 502 equally divides each of the second corrected reference image data and the image-to-be-inspected data 523 into $M_1$ partial regions, and applies SSD matching to each of the $M_2$ partial regions including pixels corresponding to edge region information Re (to be described below) of the $M_1$ partial regions, using only pixels corresponding to the edge region information Re (where $M_1$ and $M_2$ are natural numbers that satisfy $M_1 \geq M_2$. Thereby, the local shift amount estimation section 502 estimates $M_2$ local shift amounts S2 ($S2_1 = (s2_{x1}, s2_{y1})$, $S2_2 = (s2_{x2}, s2_{y2})$, and $S2_{M2} = (s2_{xM2}, s2_{yM2})$. The local shift amount estimation section 502 transmits the local shift amounts S2 to the distortion amount estimation section 503.

Based on the $M_2$ local shift amounts S2 received from the local shift amount estimation section 502, the distortion amount estimation section 503 estimates a distortion amount vector $C_d$. The distortion amount vector $C_d$ expresses, in a vector format, a coefficient of a distortion amount d between positions of corresponding pixels of the two items of image data expressed in a polynomial equation of a given degree. Specifically, when, for example, a distortion amount d is expressed in a polynomial of degree 2, the distortion amount vector $C_d$ is expressed as a column vector consisting of six coefficients ($c_{d1}$, $c_{d2}$, $c_{d3}$, $c_{d4}$, $c_{d5}$, and $c_{d6}$. In this case, a distortion amount $d=(d_x(x, y), d_y(x, y))$ at the position of a pixel at a given position (x, y) in image data is calculated, using the coefficients $c_{d1}$ to $c_{d6}$, in accordance with the following formula (2):

$$\left. \begin{array}{l} d_x(x, y) = c_{dx1}x^2 + c_{dx2}xy + c_{dx3}y^2 + c_{dx4}x + c d_{x5}y + c_{dx6} \\ d_y(x, y) = c_{dy1}x^2 + c_{dy2}xy + c_{dy3}y^2 + c_{dy4}x + c_{dy5}y + c_{dy6} \end{array} \right\} \quad (2)$$

The distortion amount estimation section 503 transmits the estimated distortion amount vector $C_d$ to the correction section 505. Details of the technique of estimating a distortion amount vector $C_d$ will be described later. The edge region extraction section 504 receives reference image data (first corrected reference image data) corrected by the correction section 505. Based on the first corrected reference image data and the image-to-be-inspected data 523, the edge region extraction section 504 extracts a region in the first corrected reference image data including a pixel whose luminance significantly changes from that of a pixel adjacent thereto as an edge region. The edge region extraction section 504 transmits the extracted information indicating the edge region to the correction section 505 as edge region information Re. The edge region information Re is included in the $M_2$ partial regions based on which the local shift amounts S2 are estimated. Details of the technique of extracting the edge region information will be described later.

The correction section 505 includes a shift amount correction section 505-1 and a luminance correction section 505-2.

Upon receiving the global shift amount S1 from the global shift amount estimation section 501, the shift amount correction section 505-1 applies the global shift amount S1 to the reference image data 522, and generates first corrected reference image data. The correction section 505 transmits the generated first corrected reference image data to the edge region extraction section 504.

Upon receiving the edge region information Re from the edge region extraction section 504, the luminance correction section 505-2 corrects the luminance using the luminance value in a region of the first corrected reference image data that corresponds to the edge region information Re, and generates second corrected reference image data. The correction section 505 transmits the second corrected reference image data to the local shift amount estimation section 502.

Upon receiving the distortion amount vector $C_d$ from the distortion amount estimation section 503, the shift amount correction section 505-1 applies the distortion amount vector $C_d$ to a region of the first corrected reference image data that corresponds to the edge region information Re, and generates third corrected reference image data. The correction section 505 transmits the third corrected reference image data to the comparison section 506.

The correction section 505 may remap (rearrange) the first corrected reference image data and the second corrected reference image data in such a manner that they become image data of an integer grid. The remapping technique is not limited to forward-direction remapping, and reverse-direction remapping may be applicable. The forward-direction remapping is a technique of, for example, converting corrected reference image data from a real grid to an integer grid. The reverse-direction remapping is a technique of obtaining a real luminance value from not-yet-corrected reference image data of an integer grid by interpolation, and converting it to corrected reference image data of an integer grid. The reverse-direction remapping is capable of reducing quantization errors, compared to the forward-direction remapping, while reducing the computation amount to be as small as that of the forward-direction remapping.

Upon receiving the third corrected reference image data from the correction section 505, the comparison section 506 compares the third corrected reference image data with the image-to-be-inspected data 523, and presents the comparison result to the user. More specifically, the comparison section 506 maps, for example, pixel-by-pixel differences in luminance value between the third corrected reference image data and the image-to-be-inspected data 523 onto an XY plane, and extracts a point where the difference in luminance value is larger than a predetermined threshold value as a defect portion. The comparison section 506 presents, to the user, image data of the differences in luminance value mapped onto the XY plane, along with the extracted defect portion, as a comparison result.

Prior to the estimation process of the global shift amount S1 by the global shift amount estimation section 501 or the estimation process of the local shift amounts S2 by the local shift amount estimation section 502, a pre-estimation process may be performed on the reference image data 522 and the image-to-be-inspected data 523, even though such a process is omitted in FIG. 4. The pre-estimation process primarily functions as, for example, a noise filter that reduces noise included in the two items of image data. Specifically, a Gaussian blur process, for example, is applicable as a pre-estimation process.

Prior to the comparison process by the comparison section 506, a pre-comparison process may be performed on the reference image data 522 and the image-to-be-inspected data 523, even though such a process is omitted in FIG. 4. The pre-comparison process primarily functions as, for example, a noise filter that reduces noise included in two items of image data, similarly to the pre-estimation process. Specifically, a non-local means (NLM) process, for example, is applicable as the pre-comparison process. A noise reduction process that is applicable to a pre-estimation process (e.g., a Gaussian blur process) and a noise reduction process that is applicable to a pre-comparison process (e.g., an NLM process) are not applied in an overlapping manner.

1.2 Operation

Next, an operation of an inspection apparatus according to the first embodiment will be described.

1.2.1 Overall Operation of Inspection Apparatus

First, an overall operation of an inspection apparatus according to the first embodiment will be described.

Figure 5:
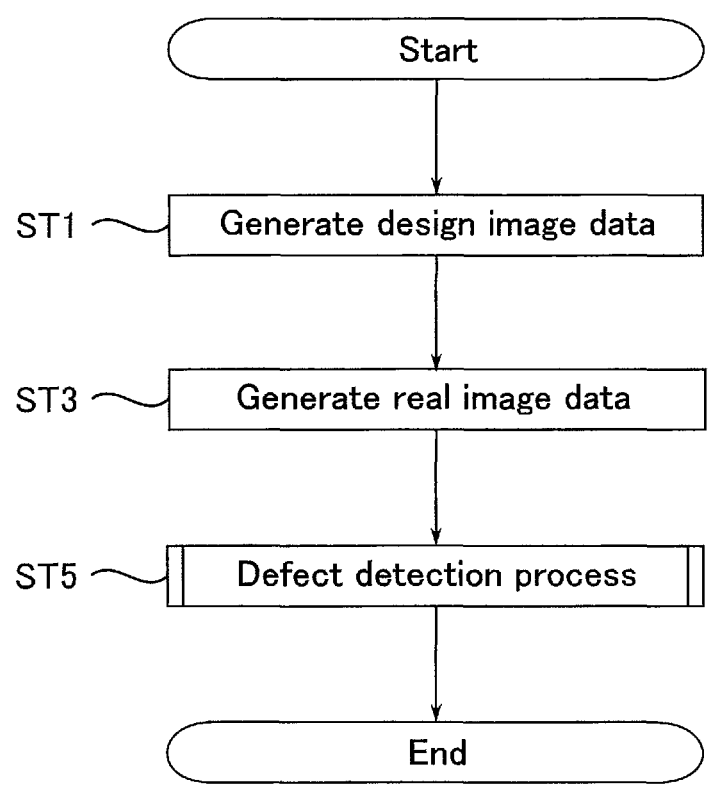
FIG. 5 is a flowchart illustrating an example of an overall operation of the inspection apparatus according to the first embodiment.

FIG. 5 is a flowchart illustrating an overall operation of the inspection apparatus according to the first embodiment. As shown in FIG. 5, the overall operation is principally applied to a DB comparison.

At step ST1, the design image data generation device 30 generates design image data based on design data of a pattern targeted for inspection. The design image data generation device 30 transmits the generated design image data to the defect detection device 50.

At step ST3, the real image data generation device 10 generates real image data of a pattern transferred onto the semiconductor device 110 by mounting the semiconductor device 110 targeted for inspection on the stage 108 and emitting an electron beam from the electron source 102. The real image data generation device 10 transmits the generated real image data to the defect detection device 50.

At step ST5, the defect detection device 50 stores the design image data generated at step ST1 as reference image data 522, stores the real image data generated at step ST3 as image-to-be-inspected data 523 in the storage unit 52, and performs a defect detection process.

This is the end of the overall operation.

1.2.2 Defect Detection Operation

Next, a defect detection operation included in the above-described overall operation of the inspection apparatus according to the first embodiment will be described.

1.2.2.1 Flowchart

Figure 6:
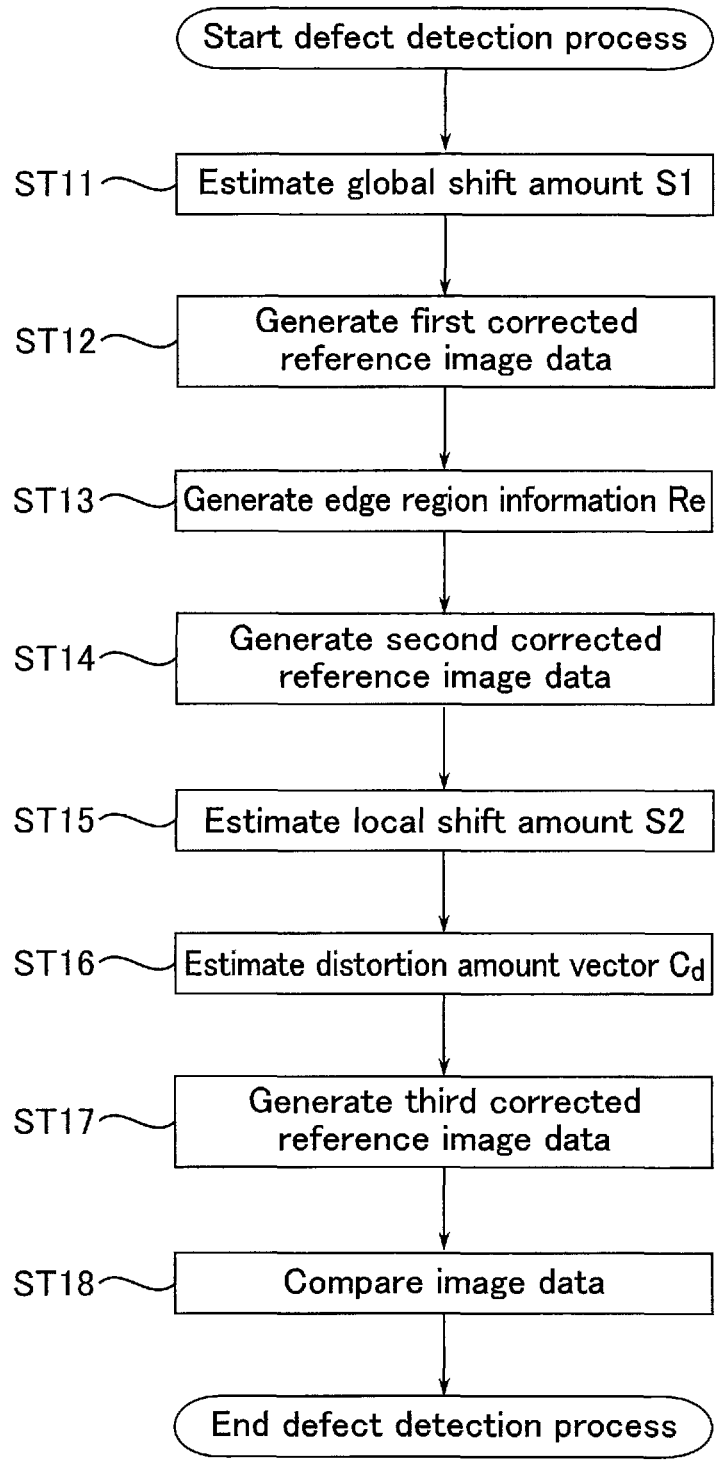
FIG. 6 is a flowchart illustrating an example of a defect detection operation in the defect detection device of the inspection apparatus according to the first embodiment.

A flowchart of a defect detection operation in the defect detection device according to the first embodiment will be described with reference to FIG. 6. FIG. 6 illustrates details of step ST5 shown in FIG. 5.

As shown in FIG. 6, at step ST11, the control unit 51, which functions as a global shift amount estimation section 501, executes SSD matching on the entirety of the reference image data 522 and the image-to-be-inspected data 523, and estimates a global shift amount S1. Prior to the estimation of the global shift amount S1, the control unit 51 may execute a pre-estimation process. Specifically, the control unit 51 may apply a Gaussian blur process to each of the reference image data 522 and the image-to-be-inspected data 523.

At step ST12, the control unit 51, which functions as a shift amount correction section 505-1, generates first corrected reference image data based on the global shift amount S1 estimated at step ST11.

At step ST13, the control unit 51, which functions as an edge region extraction section 504, extracts an edge region of the first corrected reference image data, and generates edge region information Re.

At step ST14, the control unit 51, which functions as a luminance correction section 505-2, generates second corrected reference image data, based on the edge region information Re generated at step ST13.

At step ST15, the control unit 51, which functions as a local shift amount estimation section 502, executes SSD matching on a region of each of the second corrected reference image data and the image-to-be-inspected data 523 corresponding to the edge region information Re, and estimates $M_2$ local shift amounts S2. Specifically, the control unit 51 divides each of the image-to-be-inspected data 523 and the second corrected reference image data generated at step ST14 into $M_1$ partial regions. Of the $M_1$ partial regions, the control unit 51 executes SSD matching on each of the $M_2$ partial regions corresponding to the edge region extracted at step ST13 using pixels corresponding to the edge region information Re, and estimates $M_2$ local shift amounts S2.

At step ST16, the control unit 51, which functions as a distortion amount estimation section 503, estimates a distortion amount vector $C_d$ of the second corrected reference image data with respect to the image-to-be-inspected data 523, based on the $M_2$ local shift amounts S2 estimated at step ST15.

At step ST17, the control unit 51, which functions as a shift amount correction section 505-1, further corrects the position of the second corrected reference image data based on the distortion amount vector $C_d$ estimated at step ST15, and generates third corrected reference image data.

At step ST18, the control unit 51, which functions as a comparison section 506, compares third pre-processed reference image data generated at step ST17 with the image-to-be-inspected data 523, and presents a result of the comparison to the user. Prior to the comparison process, the control unit 51 may execute a pre-comparison process. Specifically, the control unit 51 may apply an NLM process to each of the second corrected reference image data and the image-to-be-inspected data 523.

This is the end of the defect detection operation.

1.2.2.2 Correction Operation

Next, a correction operation included in the defect detection operation in the defect detection device according to the first embodiment will be described.

Figure 7:
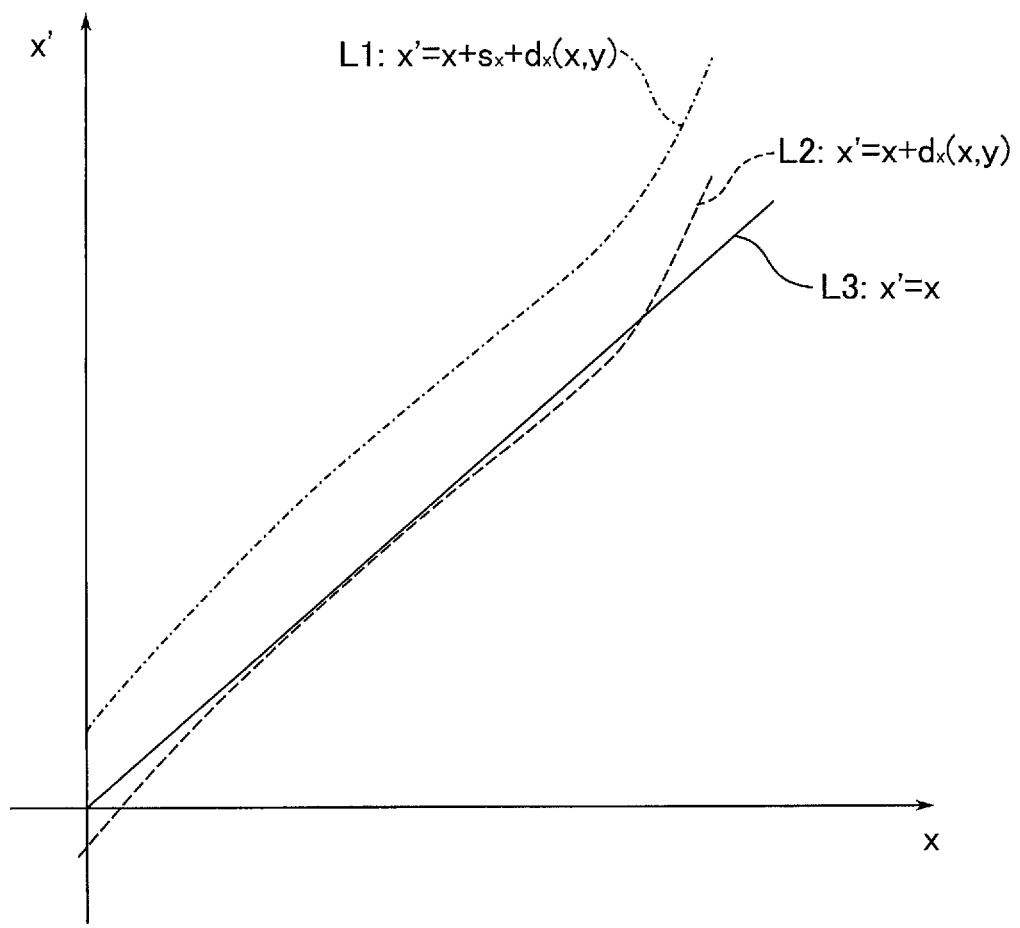
FIG. 7 is a diagram schematically illustrating an example of a correction operation in a defect detection device of the inspection apparatus according to the first embodiment.

FIG. 7 is a diagram schematically illustrating a correction operation of reference image data in the defect detection device according to the first embodiment. FIG. 7 corresponds to steps ST12 and ST17 illustrated in FIG. 6. FIG. 7 schematically shows, as an example, a position change of a pixel of the reference image data 522 before and after two corrections are executed one-dimensionally (with respect to the x-axis direction). In the example of FIG. 7, a position x of a pixel of the image-to-be-inspected data 523 is shown on the lateral axis, and a position x' of a pixel of the reference image data 522 corresponding to the image-to-be-inspected data 523 (containing the first corrected reference image data and the third corrected reference image data) is shown on the vertical axis.

As shown in FIG. 7, a position gap as shown by a line L1 may exist between the reference image data 522 and the image-to-be-inspected data 523 prior to the correction. That is, the cause of the position gap is roughly classified into a shift amount $s_x$ and a distortion amount $d_x(x, y)$, and the positions x and x' can be associated, using them as in the following formula (3):

$$x' = x + s_x + d_x(x,y) \quad (3)$$

Here, the shift amount $s_x$ indicates a shift amount that uniformly occurs over the entire image data, regardless of the position of the pixel, and the distortion amount $d_x(x,y)$ indicates a shift amount (which is non-linear with respect to the position of the pixel) that occurs depending on the position of the pixel.

The correction section 505 generates first corrected reference image data by removing the shift amount $s_x$. That is, a distortion amount $d_x(x, y)$ may exist between the first corrected reference image data and the image-to-be-inspected data 523, as shown by the line L2.

The correction section 505 generates third corrected reference image data by further removing the distortion amount $d_x(x, y)$. By the removal of the shift amount $s_x$ and the distortion amount $d_x(x, y)$, the third corrected reference image data and the image-to-be-inspected data may completely match, with x'=x ideally, as shown by the line L3.

1.2.2.3 Edge Region Extraction Operation and Luminance Correction Operation

Next, an edge region extraction operation and a luminance correction operation will be described.

Figure 8:
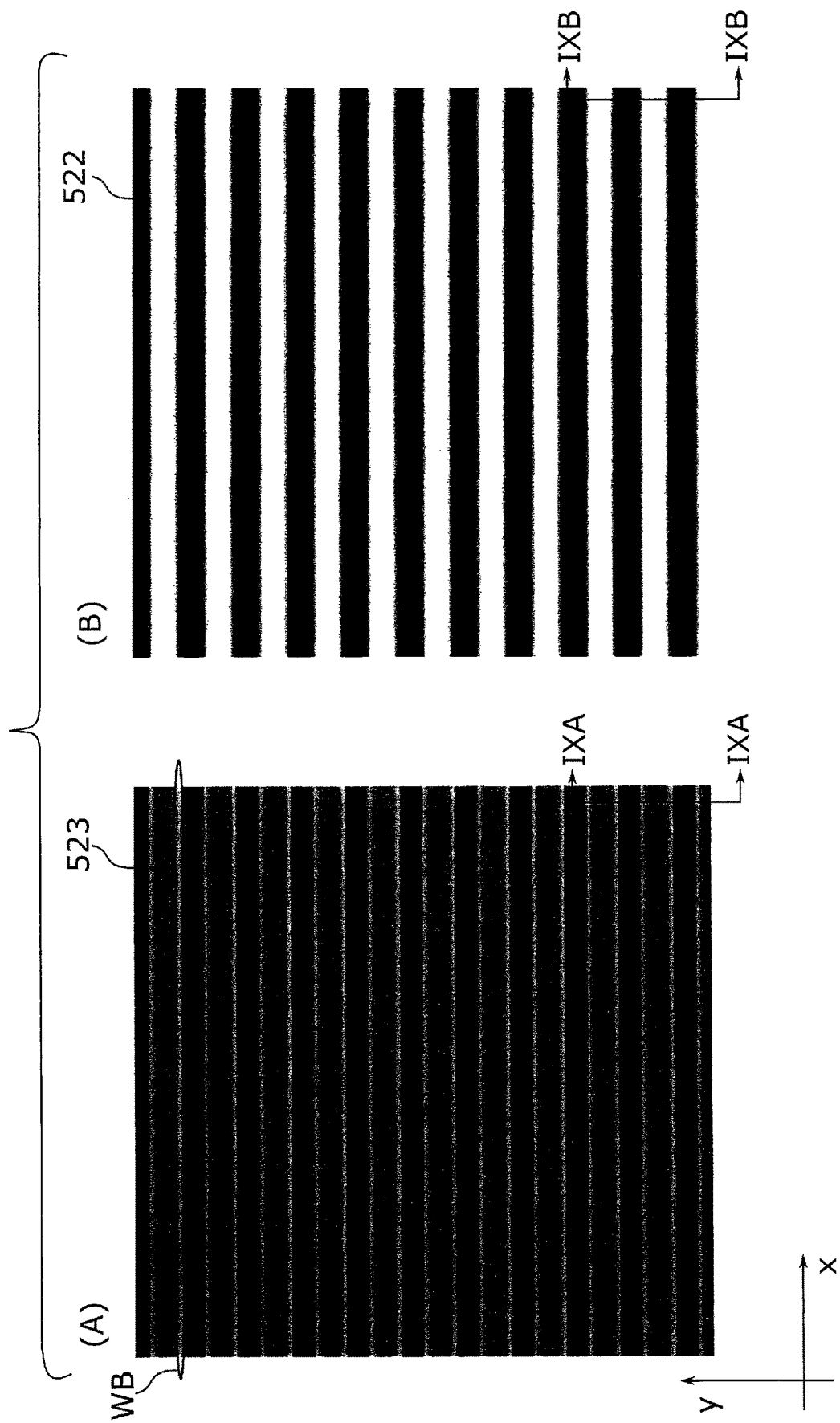
FIG. 8 is a schematic diagram illustrating a difference between image-to-be-inspected data and reference image data in the defect detection device of the inspection apparatus according to the first embodiment.

FIG. 8 is a schematic diagram illustrating a difference between image-to-be-inspected data and reference image data in the defect detection device according to the first embodiment. In FIG. 8, the image-to-be-inspected data 523 and the reference image data 522 in a case where a line-and-space circuit pattern is acquired as an SEM image are respectively shown at the left (FIG. 8(A)) and at the right (FIG. 8(B)).

As shown in FIG. 8(A), a band-shaped region WB that has a high secondary electron intensity and a high reflection electron intensity appears in an edge region of the pattern in the image-to-be-inspected data 523 acquired as an SEM image. The region WB is also referred to as a white band, image, and may change according to various factors such as a material of the sample, an inclination of the edge, a line width, a circuit pattern, etc.

On the other hand, as shown in FIG. 8(B), the reference image data 522 generated as the design image data may contain information on a line-and-space circuit pattern; however, it is difficult to include detailed information such as a final exposure pattern due to restrictions on the calculation cost, etc. It is thus difficult to generate reference image data 522 in which a complicated luminance pattern that actually appears in the image-to-be-inspected data 523, such as the above-described region WB, is reproduced. Accordingly, the luminance pattern tends to be simpler than that of the image-to-be-inspected data 523. That is, in a DB comparison of an SEM image, even if circuit patterns of comparison targets are identical, there is a possibility that the luminance pattern may differ between the image-to-be-inspected data 523 and the reference image data 522.

However, when the image-to-be-inspected data 523 and the reference image data 522 have different luminance patterns, the precision in SSD matching may deteriorate. More specifically, in formula (1) relating to the evaluation value E of the SSD matching, it is required that the following formula (4) be satisfied in the vicinity of the true shift amount $S = (s_x, s_y)$.

$$\left. \begin{array}{l} \dfrac{\partial E(s_x, s_y)}{\partial s_x} = 2 \sum_{j=0}^{N-1} \sum_{i=0}^{N-1} \left\{ [I_S(i-s_x, j-s_y) - I_R(i, j)] \dfrac{\partial I_S(i-s_x, j-s_y)}{\partial s_x} \right\} = 0 \\ \dfrac{\partial E(s_x, s_y)}{\partial s_y} = 2 \sum_{j=0}^{N-1} \sum_{i=0}^{N-1} \left\{ [I_S(i-s_x, j-s_y) - I_R(i, j)] \dfrac{\partial I_S(i-s_x, j-s_y)}{\partial s_y} \right\} = 0 \end{array} \right\} \quad (4)$$

To satisfy formula (4), it is requested that either term $A = [I_S(i-s_x, j-s_y) - I_R(i, j)]$ or term $B = \partial I_S(i-s_x, j-s_y)/\partial s_x$ be regarded as 0 with respect to all the pixels.

Of all the pixels, a pixel of a region other than an edge region of a circuit pattern (e.g., a region in which a circuit pattern is not provided or a portion in a circuit pattern) has a luminance value that changes only slightly from those of its neighboring pixels. Accordingly, in a pixel in a region other than the edge region of the circuit pattern, term B of formula (4) becomes 0, regardless of the magnitude of term A, and formula (4) may be satisfied even if luminance correction is not performed.

On the other hand, of all the pixels, a pixel in an edge region of the circuit pattern (i.e., a boundary between a region in which a circuit pattern is provided and a region in which a circuit pattern is not provided) has a luminance which changes greatly from those of its neighboring pixels, and a case is assumed where term B of formula (4) does not become 0. Accordingly, in a pixel in an edge region of a circuit pattern, luminance correction may be required to approximate term A to 0. Specifically, it is preferable that the luminance correction section 505-2 correct the luminance $I_R(i, j)$ of the reference image data 522 in the edge region in such a manner that $I_s(i-s_x, j-s_y)=I_R(i, j)$ in the edge region of the circuit pattern.

FIG. 9 is a diagram illustrating an edge region extraction operation and a luminance correction operation in the defect detection device according to the first embodiment, showing characteristic values of the image-to-be-inspected data along line IXA-IXA and the reference image data along line IXB-IXB of FIG. 8.

Specifically, at the top of FIG. 9 (FIG. 9(A)), changes in luminance of the image-to-be-inspected data 523 and the reference image data 522 along the Y direction prior to luminance correction of the reference image data 522 are respectively shown as lines L4 and L5. At the center of FIG. 9 (FIG. 9(B)), a correlation coefficient C between an amount of change in luminance of the image-to-be-inspected data 523 and an amount of change in luminance of the reference image data 522 along the Y direction, as shown in FIG. 9(A), is shown as a line L6. At the bottom of FIG. 9 (FIG. 9(C)), the change in luminance of the image-to-be-inspected data 523 and the change in luminance of the reference image data 522 along the Y direction after the luminance of the reference image data 522 is corrected based on the correlation coefficient as shown in FIG. 9(B) are respectively shown as lines L4 and L5'.

As shown in FIG. 9(A), since the line L4 corresponding to the image-to-be-inspected data 523 has a luminance pattern based on the real image data, the luminance of the edge region is higher than the luminance on the circuit pattern due to the effects of, for example, the white band. On the other hand, the line L5 corresponding to the reference image data 522 prior to luminance correction has a simple luminance pattern in which a white band does not appear, with the luminance reaching its maximum value on the circuit pattern and reaching its minimum value in a region outside the circuit pattern.

As shown in FIG. 9(B), the edge region extraction section 504 calculates a correlation coefficient C between the luminance change of the image-to-be-inspected data 523 and the luminance change of the reference image data 522 along the Y direction. The edge region extraction section 504 regards, for example, a section in which the correlation coefficient C is greater than the threshold value Ct as a section that has a correlation, and extracts such a section as a section targeted for luminance correction (i.e., an edge region). The threshold value Ct is a real number defined in a range greater than 0 and equal to or less than 1 (0<Ct≤1) when the correlation coefficient C is equal to or greater than −1 and equal to or less than 1, and indicates no correlation when 0.

As shown in FIG. 9(C), upon receiving, from the edge region extraction section 504, edge region information Re indicating a section extracted as a section targeted for luminance correction, the luminance correction section 505-2 performs linear correction as shown in formula (5), using a gain α and an offset β.

$$I'_R=\alpha I_R+\beta \qquad (5)$$

Here, $I_R$ and $I_R'$ respectively indicate the luminance of the reference image data 522 before and after correction.

More specifically, the luminance correction section 505-2 linearly corrects the luminance of the reference image data 522 in such a manner that a mean and a standard deviation of the luminance of the reference image data 522 match a mean and a standard deviation of the luminance of the image-to-be-inspected data 523 in a section targeted for luminance correction.

This is the end of the edge region extraction operation and the luminance correction operation.

1.2.2.4 Distortion Amount Estimation Operation

Next, a distortion amount estimation operation will be described.

Figure 10:
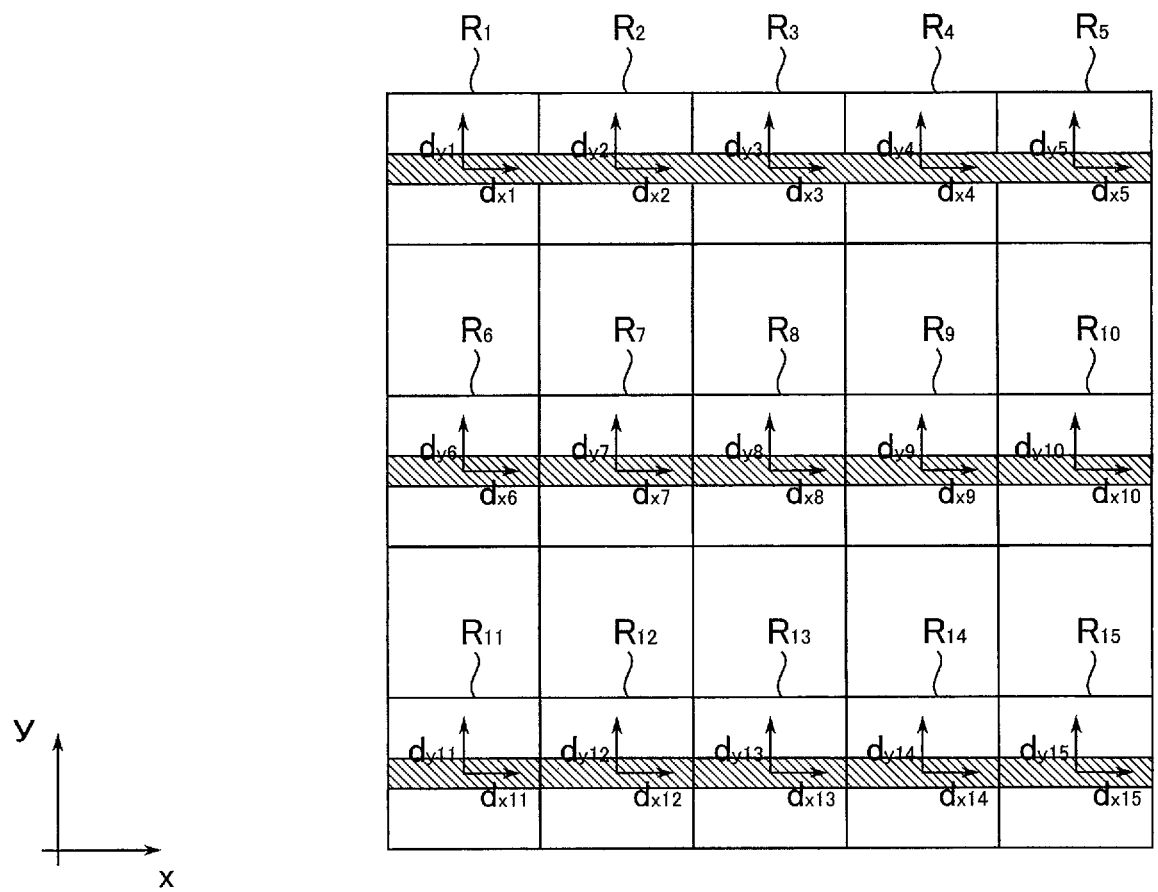
FIG. 10 is a schematic diagram illustrating an example of a distortion amount estimation operation in the defect detection device of the inspection apparatus according to the first embodiment.

FIG. 10 is a schematic diagram illustrating a distortion amount estimation operation in the defect detection device according to the first embodiment. In FIG. 10, a relationship between a representative distortion amount d of each partial region of the second corrected reference image data and a local shift amount S2 is schematically shown. In the example of FIG. 10, a case is shown where the second corrected reference image data is divided into $M_1=25$ partial regions, and a local shift amount S2 ((s2$_{x1}$, s2$_{y1}$), (s2$_{x2}$, s2$_{y2}$), . . . , and (s2$_{x15}$, s2$_{y15}$)) is estimated for, of the 25 partial regions, each of the $M_2=15$ partial regions $R_1$, $R_2$, . . . , and $R_{15}$ that include pixels extracted as edge regions (hatched regions in FIG. 10), using only pixels extracted as belonging to edge regions.

In FIG. 10, edge regions extracted from an SEM image relating to a line-and-space circuit pattern are shown, similarly to FIG. 8; however, for convenience in illustration, it does not match the circuit pattern of FIG. 8. That is, FIG. 10 shows a case where the number of lines is small compared to the line-and-space circuit pattern shown in FIG. 8 (specifically, where three line-shaped edge regions are arranged along the Y direction).

As shown in FIG. 10, the distortion amount estimation section 503 regards the local shift amounts (s2$_{x1}$, s2$_{y1}$) to (s2$_{x15}$, s2$_{y15}$) as distortion amounts (d$_{x1}$, d$_{y1}$) to (d$_{x15}$, d$_{y15}$) at representative positions (x$_1$, y$_1$) to (x$_{15}$, y$_{15}$) of corresponding partial regions $R_1$ to $R_{15}$. That is, the distortion amount estimation section 503 assumes a correspondence relation between the distortion amounts (d$_{x1}$, d$_{y1}$) to (d$_{x15}$, d$_{y15}$) and the local shift amounts (s2$_{x1}$, s2$_{y1}$) to (s2$_{x15}$, s2$_{y15}$) as shown in the following formula (6):

$$\left.\begin{aligned}s2_{xk} &= d_{xk} \approx d_x(x_k, y_k) \\ s2_{yk} &= d_{yk} \approx d_y(x_k, y_k)\end{aligned}\right\}(1 \le k \le M) \qquad (6)$$

As described above, in the first embodiment, it is assumed that the distortion amount d satisfies formula (2) at a given position (x, y). Thus, the first corrected reference image data satisfies formula (2) at at least 15 representative positions (x$_1$, y$_1$) to (x$_{15}$, y$_{15}$). Accordingly, by applying formula (2) with respect to the 15 representative positions (x$_1$, y$_1$) to (x$_{15}$, y$_{15}$), the following linear equations (7) and (8) are obtained:

$$D_x = ZC_{dx} \Leftrightarrow \begin{pmatrix} d_{x1} \\ d_{x2} \\ \vdots \\ d_{x9} \end{pmatrix} = \begin{pmatrix} x_1^2 & x_1 y_1 & y_1^2 & x_1 & y_1 & 1 \\ x_2^2 & x_2 y_2 & y_2^2 & x_2 & y_2 & 1 \\ \cdots & \cdots & \cdots & \cdots & \cdots & \cdots \\ x_9^2 & x_9 y_9 & y_9^2 & x_9 & y_9 & 1 \end{pmatrix} \begin{pmatrix} c_{dx1} \\ c_{dx2} \\ \vdots \\ c_{dx6} \end{pmatrix} \quad (7)$$

$$D_y = ZC_{dy} \Leftrightarrow \begin{pmatrix} d_{y1} \\ d_{y2} \\ \vdots \\ d_{y9} \end{pmatrix} = \begin{pmatrix} x_1^2 & x_1 y_1 & y_1^2 & x_1 & y_1 & 1 \\ x_2^2 & x_2 y_2 & y_2^2 & x_2 & y_2 & 1 \\ \cdots & \cdots & \cdots & \cdots & \cdots & \cdots \\ x_9^2 & x_9 y_9 & y_9^2 & x_9 & y_9 & 1 \end{pmatrix} \begin{pmatrix} c_{dy1} \\ c_{dy2} \\ \vdots \\ c_{dy6} \end{pmatrix} \quad (8)$$

Here, a matrix Z based on coordinates $(x_1, y_1)$ to $(x_{15}, y_{15})$ of representative positions and vectors Dx and Dy including distortion amounts $d_{x1}$ to $d_{x15}$ and $d_{y1}$ to $d_{y15}$ are determined as concrete numerical values. Accordingly, the distortion amount estimation section 503 is capable of estimating distortion amount vectors $C_{dx}$ and $C_{dy}$ by executing a computation by the least squares method on the above formulae (7) and (8) as shown in the following formula (9):

$$\left. \begin{array}{l} C_{dx} = (Z^T Z)^{-1} Z^T D_x \\ C_{dy} = (Z^T Z)^{-1} Z^T D_y \end{array} \right\} \quad (9)$$

In estimation, in order to obtain a least squares solution in an overdetermined system, it is desirable that a number $M_2$ of partial regions extracted as edge regions be greater than an element number of the distortion amount vector $C_d$ (six in the examples of formulae (7) and (8)).

However, when the number of partial regions including edge regions of the circuit pattern is small, the least squares solution will be obtained in an underdetermined system, and the solution may not be uniquely determined. In this case, the distortion amount estimation section 503 may perform, for example, L1 regularization or L2 regularization, and estimate a distortion amount vector $C_d$. Examples of L1 regularization that can be applied include ridge regression, and examples of L2 regularization that can be applied include LASSO regression; however, L1 regularization and L2 regularization are not limited thereto.

1.3 Advantageous Effects of Present Embodiment

According to the first embodiment, it is possible to suppress erroneous detection of a defect even when there is a luminance difference between a reference image and an image to be inspected. This effect will be described below.

The edge region extraction section 504 extracts, as an edge region, a region in which the amount of change in luminance of the reference image data 522 and the amount of change in luminance of the image-to-be-inspected data 523 have a correlation. Specifically, the edge region extraction section 504 calculates a correlation coefficient C in luminance between the reference image data 522 and the image-to-be-inspected data 523, and determines that a section in which the correlation coefficient C is greater than the threshold value Ct is an edge region. It is thereby possible to extract a region in which term $B = \delta I_s(i-s_x, j-s_y)/\partial s_x$ of formula (4) does not become 0 (i.e., term $A = [I_s(i-s_x, j-s_y) - I_R(i,j)]$ should be 0) in SSD matching.

The luminance correction section 505-2 linearly corrects the luminance of the reference image data 522 in such a manner that, in a partial region regarded as an edge region, a mean and a standard deviation of the luminance of the reference image data 522 matches a mean and a standard deviation of the luminance of the image-to-be-inspected data 523. Thereby, the luminance at the edge region approximates term A=0 of the above-described formula (4), and the precision of the SSD value to be calculated in SSD matching by the local shift amount estimation section 502 (to be described later) is improved. It is thereby possible to suppress erroneous detection of a defect in an image even when there is a luminance difference between a reference image and an image to be inspected.

The local shift amount estimation section 502 performs SSD matching for each partial region using pixels regarded as belonging to the edge region, but does not use pixels regarded as not belonging to the edge region for the SSD matching. It is thereby possible to exclude a region that does not include a circuit pattern (namely, an unnecessary region in defect detection) from shift amount estimation. It is thereby possible to estimate more accurate shift amounts S2.

Also, the global shift amount estimation section 501 estimates a global shift amount S1 prior to an edge region extraction process by the edge region extraction section 504. Thereby, a position difference between the pixels of reference image data 522 and the pixels of the image-to-be-inspected data 523 can be roughly approximated. It is thus possible to circumvent a situation in which, because of a large pixel position difference between the reference image data 522 and the image-to-be-inspected data 523, a region in which the amount of change in luminance of the reference image data 522 and the amount of change in luminance of the image-to-be-inspected data 523 have a correlation cannot be extracted.

2. Second Embodiment

In the first embodiment, a case has been described where the edge region extraction section 504 extracts an edge region by calculating a correlation coefficient C in luminance between the reference image data 522 and the image-to-be-inspected data 523; however, the configuration is not limited thereto. The edge region extraction section 504 may extract an edge region by, for example, calculating an amount of change of an SSD value in a predetermined partial region.

The edge region extraction section 504 divides the reference image data 522 and the image-to-be-inspected data 523 into $M_1$ partial regions as shown in FIG. 10. The edge region extraction section 504 calculates an SSD value for each of the $M_1$ partial regions, and approximates an amount of change corresponding to a shift amount of the SSD value by, for example, a quadratic function. The edge region extraction section 504 determines, for each of the $M_1$ partial regions, whether or not the quadratic coefficient of the quadratic function is equal to or greater than a threshold value, and extracts a partial region in which the quadratic coefficient is equal to or greater than a threshold value as an edge region.

Figure 11:
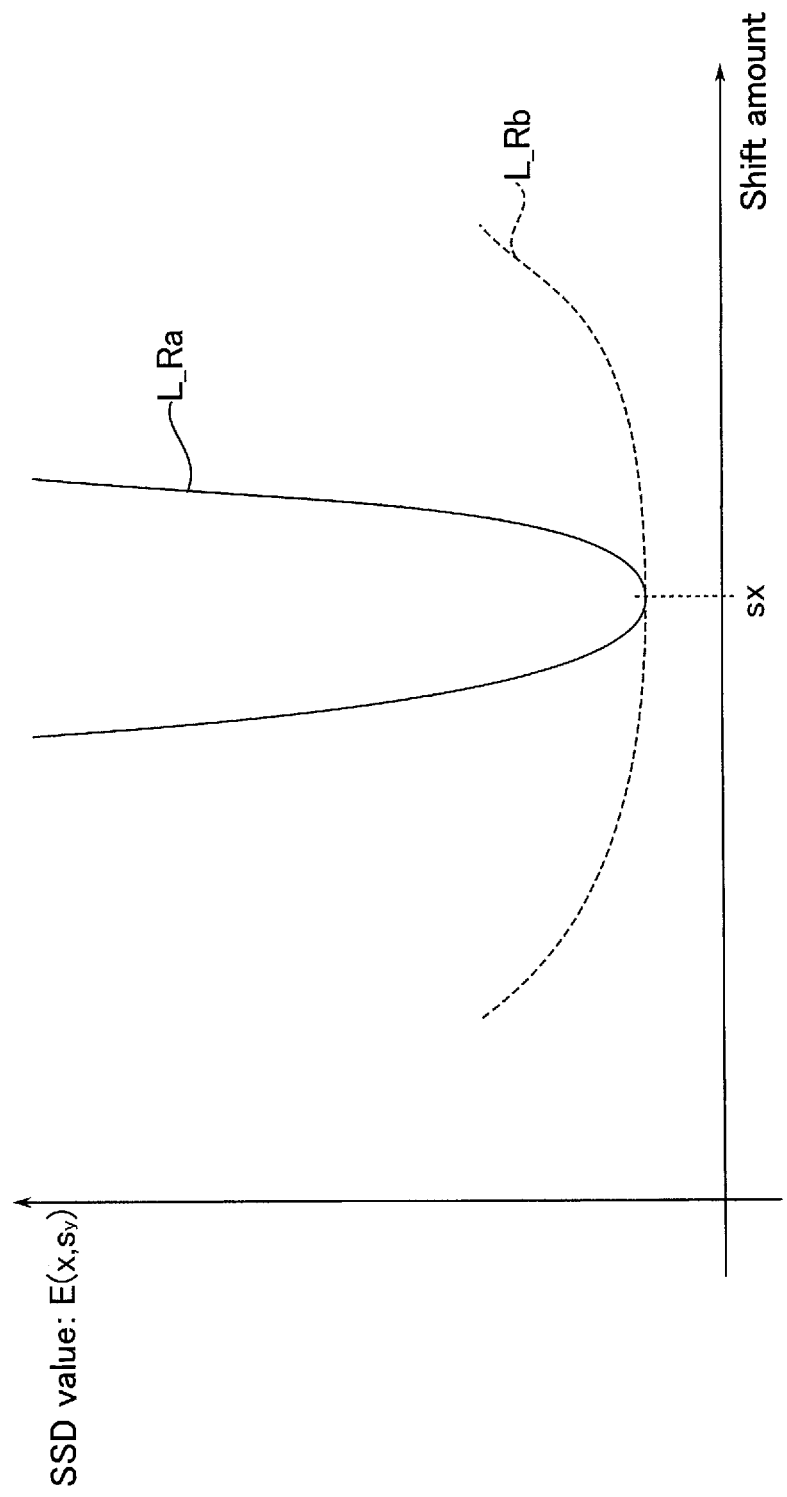
FIG. 11 is a diagram illustrating an example of an edge region extraction operation in a defect detection device of an inspection apparatus according to a second embodiment.

FIG. 11 is a diagram illustrating an edge region extraction operation in a defect detection device according to a second embodiment. In FIG. 11, a shift of an SSD value by SSD matching in the vicinity of a true shift amount $(s_x, s_y)$ in each of the partial regions Ra and Rb is shown. More specifically, in FIG. 11, a shift of an SSD value corresponding to a partial region Ra determined to be an edge region in the vicinity of a true shift amount $(s_x, s_y)$ is shown as a line L_Ra, and a shift of an SSD value corresponding to a partial region Rb determined to not be an edge region is shown as a line L_Rb. For convenience in explanation, in FIG. 11, the SSD value $E(x, s_y)$ is shown on the vertical axis, with its shift amount in the y direction fixed and its shift amount in the x direction taken on the lateral axis.

As shown in FIG. 11, the SSD value $E(x, s_y)$ takes a minimum value at the true shift amount $s_x$ in the x direction, and increases at an increasing distance from the true shift amount $s_x$. The SSD value $E(x, S_y)$ may be approximated by a quadratic function with an axis of symmetry at the true shift amount $s_x$.

In the partial region Ra, there are many boundaries between circuit-pattern portions and non-circuit-pattern portions (namely, regions in which an amount of change in luminance between adjacent pixels is large), and the SSD value increases at only a little distance from the true shift amount sx in the x direction. On the other hand, in the partial region Rb, there are few circuit patterns, and an amount of change in luminance between adjacent pixels is small. Thus, the amount of increase of the SSD value of the line L_Rb is smaller than that of the line L_Ra. Accordingly, the quadratic coefficient of the quadratic function approximated by the line L_Rb takes a value smaller than that of the quadratic coefficient of the quadratic function approximated by the line L_Ra.

In this manner, the quadratic coefficient obtained by approximating the SSD value by a quadratic function may be relevant to the presence or absence of an edge region in a partial region, and can be used as an evaluation function for extracting an edge region. Specifically, the edge region extraction section 504 calculates an amount of change of the SSD value for each partial region, and approximates the calculated amounts of change by a quadratic function. The edge region extraction section 504 extracts a partial region in which a quadratic coefficient of a quadratic function obtained by the approximation is greater than a predetermined threshold value as an edge region.

This allows the edge region extraction section 504 to extract an edge region without calculating the correlation coefficient C.

3. Others

The above-described first and second embodiments can be modified in various manners.

For example, in the above-described first and second embodiments, a case has been described where, as an example in which the luminance pattern is highly likely to differ between real image data and design image data, SEM is applied to the real image data generation device 10; however, the configuration is not limited thereto. For example, an optical scanner capable of generating, as real image data, an optical image (a transmitted light image and/or a reflected optical image) of a mask used in a semiconductor device may be applied as the real image data generation device 10.

Figure 12:
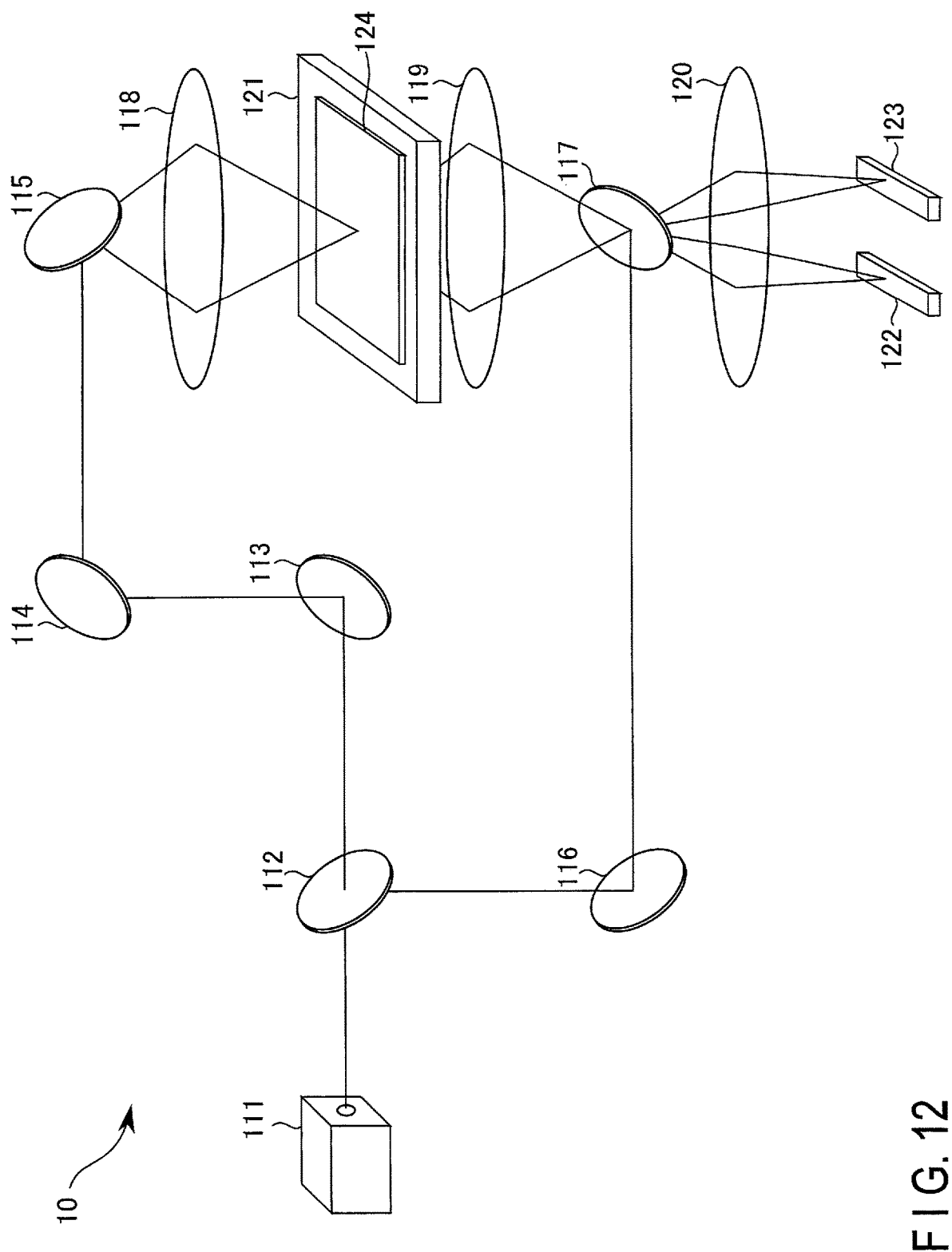
FIG. 12 is a schematic diagram illustrating an example of a hardware configuration of a real image data generation device of an inspection apparatus according to a modification.

FIG. 12 is a schematic diagram illustrating a hardware configuration of a real image data generation device according to a modification.

As shown in FIG. 12, the real image data generation device 10 may comprise a light source ill, a plurality of half mirrors 112, 113, 114, 115, 116, and 117, a plurality of objective lenses 118, 119, and 120, a stage 121, a transmitted light sensor 122, and a reflected light sensor 123.

In this case, the light source 111 is, for example, a laser light source capable of emitting ultraviolet laser light. The laser light emitted from the light source 111 is applied to a mask 124 mounted on the stage 121 via the half mirrors 112 to 117 and the objective lenses 118 and 119. The half mirrors 112 to 115 and the objective lens 118 configure a translucent optical system, and the half mirrors 112, 116, and 117 and the objective lens 119 configure a reflective optical system.

It is thereby possible to illuminate the mask 124 from above and below, and the transmitted light and the reflected light of the mask 124 are respectively input to the transmitted light sensor 122 and the reflected light sensor 123 via the objective lens 120. The transmitted light sensor 122 and the reflected light sensor 123 detect transmitted light and reflected light, respectively, of the mask 124. The real image data generation device 10 processes the detected transmitted light and reflected light in an unillustrated processor, and generates real image data of the mask 124. The generated real image data is transmitted to the defect detection device 50.

With the above-described configuration, it is possible to perform a defect detection process even when an optical image is generated as real image data. It is thereby possible to obtain an advantageous effect similar to those of the first and second embodiments even when the optical image data generated by an optical scanner is input to the defect detection device 50.

In the first and second embodiments, a case has been described where a shift amount of the reference image data 522 is corrected; however, the configuration is not limited thereto, and a shift amount of the image-to-be-inspected data 523 may be corrected.

In the above-described first and second embodiments, a case has been described where, after the luminance of the reference image data 522 is corrected by the luminance correction section 505-2, the shift amount correction section 505-1 executes a shift amount correction based on a distortion amount vector $C_d$; however, the configuration is not limited thereto. For example, the global shift amount estimation section 501 may be configured, after the luminance of the reference image data 522 is corrected by the luminance correction section 505-2, to estimate a global shift amount again using the luminance-corrected reference image data 522. The shift amount correction section 505-1 may generate corrected reference image data to be transmitted to the comparison section 506 by applying a global shift amount that has been estimated based on the luminance-corrected reference image data 522.

In the above-described first and second embodiments, a case has been described where the control unit 51 of the defect detection device 50 operates by a CPU; however, the configuration is not limited thereto. For example, the control unit 51 may be configured to include a dedicated circuit (dedicated processor) configured of one or more GPUs, ASICs, FPGAs, etc. By the dedicated processor, the control unit 51 is capable of implementing functions by the global shift amount estimation section 501, the local shift amount estimation section 502, the distortion amount estimation section 503, the edge region extraction section 504, the correction section 505, and the comparison section 506.

While certain embodiments have been described, these embodiments have been presented by way of example only, and are not intended to limit the scope of the inventions. Indeed, the embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit.

What is claimed is:

1. An inspection apparatus comprising:
an image generation device which generates a second image corresponding to a first image; and a defect detection device which detects a defect in the second image with respect to the first image, wherein
the defect detection device is configured to:
extract a first partial region in which an amount of change of a luminance of the first image and an amount of change of a luminance of the second image have a correlation;
correct, in the first partial region, the luminance of the first image with respect to the luminance of the second image; and
estimate a first value indicating a position difference between the first image and the second image based on a luminance difference between the luminance-corrected first image and the second image.

2. The apparatus of claim 1, wherein
the extracting includes extracting the first partial region based on a correlation coefficient between the amount of change of the luminance of the first image and the amount of change of the luminance of the second image.

3. The apparatus of claim 1, wherein
the extracting includes extracting the first partial region based on an amount of change of a value of a sum of squared differences (SSD) between the first image and the second image.

4. The apparatus of claim 1, wherein
the correcting the luminance includes linearly correcting the luminance of the first image in such a manner that, in the first partial region, a mean and a standard deviation of the luminance of the first image match a mean and a standard deviation of the luminance of the second image.

5. The apparatus of claim 1, wherein
the defect detection device estimates the first value not on the basis of a luminance difference between the first image and the second image in a second partial region excluding the first partial region.

6. The apparatus of claim 5, wherein
the first partial region includes a boundary of a pattern included in the first image.

7. The apparatus of claim 6, wherein
the second partial region does not include a boundary of a pattern included in the first image.

8. The apparatus of claim 1, wherein
the defect detection device is configured to:
estimate a second value indicating a position difference between the first image and the second image based on a luminance difference between the first image and the second image; and
extract the first partial region based on a first image whose position is corrected based on the second value and the second image.

9. The apparatus of claim 1, wherein
the first image is based on a database, and
the second image is based on a real image.

10. The apparatus of claim 1, wherein
the image generation device includes an optical scanner or a scanning electron microscope.

11. An inspection method executed by an inspection apparatus including: an image generation device which generates a second image corresponding to a first image; and a defect detection device which detects a defect in the second image with respect to the first image, the method comprising:
extracting a first partial region in which an amount of change of a luminance of the first image and an amount of change of a luminance of the second image has a correlation;
correcting, in the first partial region, the luminance of the first image with respect to the luminance of the second image; and
estimating a first value indicating a position difference between the first image and the second image based on a luminance difference between the luminance-corrected first image and the second image.

12. The method of claim 11, wherein
the extracting includes extracting the first partial region based on a correlation coefficient between the amount of change of the luminance of the first image and the amount of change of the luminance of the second image.

13. The method of claim 11, wherein
the extracting includes extracting the first partial region based on an amount of change of a value of a sum of squared differences (SSD) between the first image and the second image.

14. The method of claim 11, wherein
the correcting the luminance includes linearly correcting the luminance of the first image in such a manner that, in the first partial region, a mean and a standard deviation of the luminance of the first image match a mean and a standard deviation of the luminance of the second image.

15. A non-transitory computer-readable storage medium storing thereon a program used in an inspection apparatus including: an image generation device which generates a second image corresponding to a first image; and a defect detection device which detects a defect in the second image with respect to the first image,
the program causing a processor of the defect detection device to:
extract a first partial region in which an amount of change of a luminance of the first image and an amount of change of a luminance of the second image has a correlation;
correct, in the first partial region, a luminance of the first image with respect to a luminance of the second image; and
estimate a first value indicating a position difference between the first image and the second image based on a luminance difference between the luminance-corrected first image and the second image.

16. The storage medium of claim 15, wherein
the extracting includes extracting the first partial region based on a correlation coefficient between the amount of change of the luminance of the first image and the amount of change of the luminance of the second image.

17. The storage medium of claim 15, wherein
the extracting includes extracting the first partial region based on an amount of change of a value of a sum of squared differences (SSD) between the first image and the second image.

18. The storage medium of claim 15, wherein
the correcting the luminance includes linearly correcting the luminance of the first image in such a manner that, in the first partial region, a mean and a standard deviation of the luminance of the first image match a mean and a standard deviation of the luminance of the second image.

* * * * *